Jan. 21, 1930.  J. C. PATERSON ET AL  1,744,497
APPARATUS FOR MAKING WAFER CONES, CUPS, CORNETS, AND THE LIKE
Filed March 23, 1926   4 Sheets-Sheet 4

Inventors:
John Currie Paterson,
George Ralph Baker.
Attorney:

Patented Jan. 21, 1930

1,744,497

UNITED STATES PATENT OFFICE

JOHN CURRIE PATERSON AND GEORGE RALPH BAKER, OF LONDON, ENGLAND, ASSIGNORS TO BAKER PERKINS COMPANY INCORPORATED, OF NEW YORK, N. Y., A CORPORATION OF NEW YORK

APPARATUS FOR MAKING WAFER CONES, CUPS, CORNETS, AND THE LIKE

Application filed March 23, 1926, Serial No. 96,789, and in Great Britain August 26, 1925.

This invention relates to apparatus for making wafer cones, cups, cornets and the like from liquid such as batter or similar wafer material, such receptacles being commonly used for receiving ice cream or similar substances, in which apparatus are provided a plurality of cone, cup or similarly shaped shells or mould members, each of which is split or formed in two separable parts or halves, and into which is automatically inserted a similarly shaped core or block of slightly smaller size, a pair of said shells and a core forming between them a complete mould for reception of the wafer material. The moulds charged with the wafer material are moved through the baking chamber in an endless path, for example a circular one and when the baking is completed, the shell members are automatically separated, the cores withdrawn with the cones thereon and the baked cones removed from the cores in succession at a determined point in the path or course of the moulds. In certain cases the moulds or shell walls or the supports therefor or the cores may be hollow and these may contain heating elements in substitution of or in addition to the heating means within the baking chamber.

The invention is mainly characterized thereby that the mould members are mounted severally by arms pivoted on a central shaft, the axes of the mould cavities being radial to the axis of the said shaft, and the larger diameters of the mould cavities being outwards; and the cores are inserted into the mould cavities at one place in the path of the moulds and are withdrawn by a rotary action in the plane of the mould path at another place in the mould path, as one of the mould members is being transferred across the unoccupied gap between the mould members at the commencement and termination respectively of the moulding and baking course.

It will be understood that the shell or mould members are so constructed and arranged that when separated at the termination of baking, for removal of a finished cone or row of same, that is to say, at the end of the course, one of said half mould or shell members is removed to permit withdrawal of the core and finished cone and is then transferred to the beginning of the course to constitute the complementary half shell of the mould at the commencement of the course to receive a new charge for baking. A continuous cone producing and baking operation is thus effected.

The invention also comprises other features of construction, combination and arrangement of parts as set forth in the appended claims and hereinafter fully described with reference to the accompanying drawings in which:—

In the embodiment shown the course of the mould shells and cones is a rotary one, the direction being indicated by arrow $x$ (Fig. 1) and the moulds are disposed in a baking chamber enclosed by a casing 1 the walls of which are shown as formed double and filled with slag wool 2 or other heat insulating material. The casing is shown as provided with a door 1ª for inspection purposes and a damper-controlled uptake 1ᵈ for gases of combustion. The half shells or mould members 3 are arranged in rows transversely of the casing 1 each row being formed in opposite sides of a casting or block 4 carrying on each side a number, say ten, of said half shells extending across the baking chamber, five of such members being indicated in Fig. 2. Each of the castings or blocks 4 is carried by a number of radiating arms or spokes 5 for example two thereof, all adapted for rotation about a common axis in order that they may revolve in the rotary path assigned to them. This axis comprises a central hollow non-rotatable shaft or sleeve 6 to which reference is hereinafter more fully made, and by reference to Fig. 1 it will be seen that the circular course in which the mould shells travel is not completely filled by said rows of shells but a gap 7 is left between the commencement 8 of the baking course and the termination 9 thereof in order that the transfer of the aforesaid mould members 3 may take place, the disposition being such that the two half shells of each mould are separated at the end of the course and the finished cones thereupon removed at point 9 at a time when the axes of the moulds are horizontal or substantially so, while the closing or completion of said shells for receiving a charge of wafer material adjacent the point 8 takes place when the axes of the moulds are approaching the vertical. The batter is squirted in through the orifice $1^b$ in the usual manner by a pump (not shown) and falls by gravity into the open mould therebelow.

Figure 1:
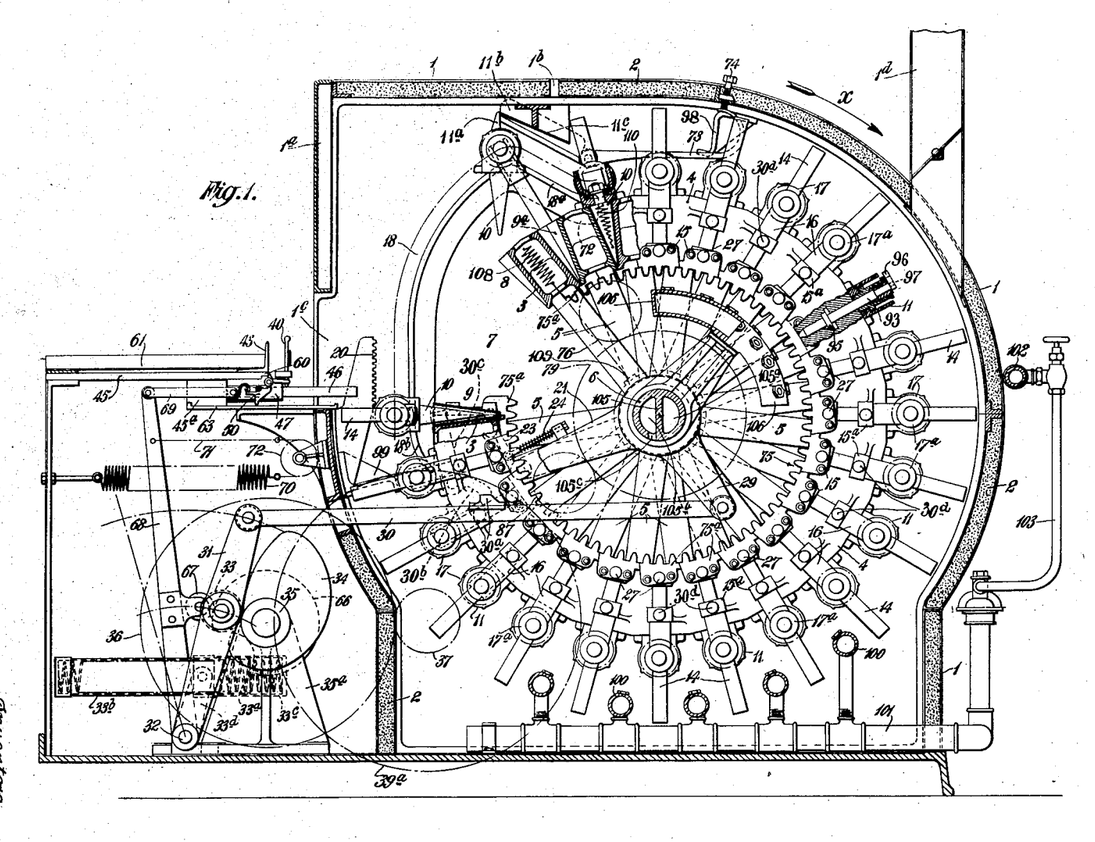
Fig. 1 is a side elevation with the casing of the baking chamber and other parts in section.
Figure 2:
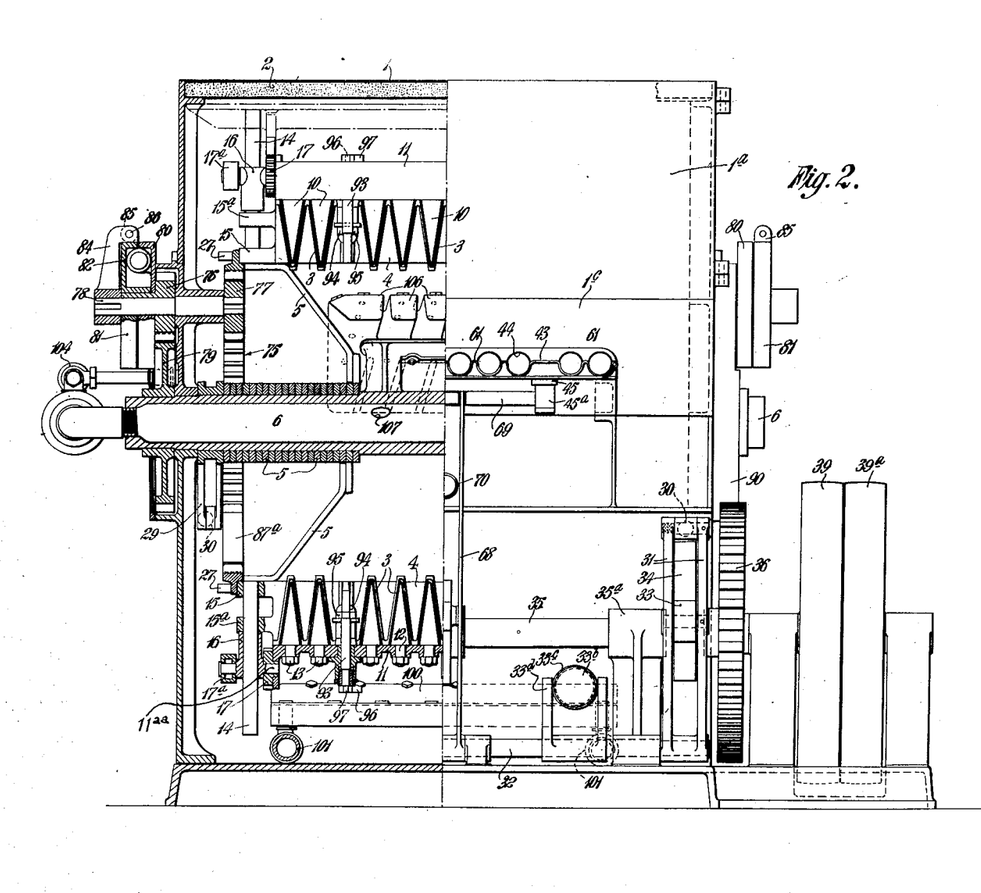
Fig. 2 is a part vertical section and part end elevation from the left of Fig. 1.

To now refer to the core members 10 of the moulds, these are carried in rows, corresponding to the shells 3, on transverse frames 11 of channel section, being shown in Fig. 2 as secured to said frames by studs 12 and nuts 13. The frames 11 are rotatably mounted on studs $11^{aa}$ carried by sleeves 16 which are slidable on radially extending rods 14 so that the cores may be guided thereon into the moulds; the said rods being carried by lugs 15, $15^a$ extending laterally from the shell blocks 4. Each frame 11 also carries fixed to it a pinion 17. The sleeve 16 which slides on the rod 14 carries a roller or other anti-friction means $17^a$. The pinions and rollers are provided at each side of the frame and each roller $17^a$ co-operates with a cam-path 18 disposed between the removal and feed positions adjacent the gap 7. The cam paths are so disposed that between said removal and feed positions the cores are moved outwardly away from the shells, and after the latter have been charged with wafer material at the point $9^a$ as before mentioned, a drop $18^a$ in the cam-path causes said cores 10 to be lowered into the shells in the correct position axially aligned therewith. In Fig. 1 of the drawings a core 10 is shown just approaching the drop for the purpose stated.

A tail or extension $11^a$ carried by the core frame 11 engages an abutment in the form of a bracket $11^b$ extending inwards from the casing 1. As the cores which at this time are hanging freely, commence to travel down the portion $18^a$ of the cam path the cores are rocked counter-clockwise by engagement of the tail $11^a$ with said bracket $11^b$, and as each row of cores passes down said path $18^a$ the cores are caused to slowly enter the moulds 3 by reason of the smaller angle of the face $11^c$ of the bracket. The drop $18^a$ in the cam-path is curved slightly at its lower end as at 72 or so shaped as to slow down the core as it approaches the base of the mould in order to allow steam given off by the heated batter to escape before the core reaches its completely inserted position; and to ensure the latter position being positively reached, the cores at the commencement of their rotary path are subjected to elastic inward pressure by means of a cam or plate 73 having some degree of resiliency and acting on the rollers $17^a$ of the core support 11, the pressure exerted by which cam can be adjusted from the exterior of the casing by means of a screw 74 bearing on the curved end of the plate.

For the remainder of the course the cores are carried round in the moulds 3 for the baking operation, then at the termination of said course and after the half shells have been moved from the final row, as will be explained later, the cores, together with the finished cones thereon, are removed from the remaining half shells through an aperture $1^c$ in the casing 1, by being turned through an angle of approximately 180°, this being effected by the pinions 17 engaging fixed racks 20, one at each side, extending inwards from the inside of the casing. Thus as the moulds arrive at the discharge position 9 and as one half shell 3 commences to move forward to position 8 as shown in Fig. 1 the engagement of the pinions 17 with the racks 20 will cause the cores together with the finished cones to be rotated and delivered through the aperture $1^c$ where the cones are acted on by extracting means to be later described.

It will be understood that the length of the racks 20 is such that they will rock the cores through the angle aforesaid while the pinions 17 are riding up the racks, whereafter the pinions in further upward movement will leave the racks and the cores will then be free to move downward under the action of gravity in preparation for their reinsertion into the moulds at the position 8.

The commencing portion of the cam path 18 is curved as shown at $18^b$ somewhat in advance of the position 9 and the engagement of the roller $17^a$ of the core support 11 with said curved portion causes an initial partial radial withdrawal of the core to free it from the cone while the latter is positively held in the closed mould before said core is finally and completely withdrawn by the rotary movement above described.

The rotary movement of the complete moulds constituted by the shells 3 with the inserted cones 10 may be intermittent, in which case, as each completed shell at the commencement 8 of the course comes adjacent or opposite the feeding means for the wafer material, the rotation is arrested, similar half shells at the termination 9 of the course being also arrested.

In the meantime however the block 4 containing the half shells on each side, that is to say, those on the rear side which have been separated from the finished cones and those on the forward side for completing the first row of shells, has been transferred or moved through the gap 7 to the commencement of the course to receive the charge of wafer material. These movements may be effected by any convenient mechanism but that which has been specially provided in the present embodiment comprises oscillating arms or driving members 21, (see particularly Fig. 6) for example one at each side of the apparatus and mounted on a sleeve 22 carried by the aforesaid central shaft 6. Said arm 21 has pivoted thereto a trip 23 under the action of a spring 24 coiled about a rod 25 pivoted to the trip and extending through a lug 26 on the driving arm.

The movement of the trip in outward direction is limited by nut 26ª on rod 25. The trip is shaped to engage a pin 27 extending from the lug 15 of the mould block 4 so that as the driving arms 21 are oscillated in direction of rotation of the moulds, viz, direction of arrow $x$, the block 4 and half shells 3 carried thereby are transferred to the commencement 8 of the course and then the whole series of moulds with the cores 10 therein are moved to the next position, that is to say, through a distance corresponding to that between the axes of two adjacent moulds. The driving arms 21 then return to pick up another block 4 and row of shells 3, during which time the trip 23 rotates about its pivot against the action of its spring 24 and so on through the complete cycle.

Figure 3:
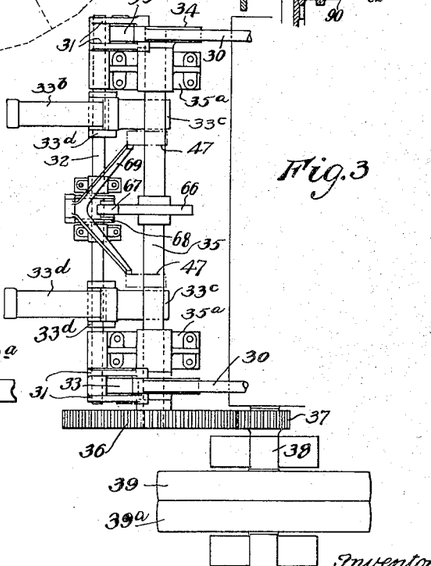
Fig. 3 is a partial plan view showing operating mechanism hereinafter described.

The driving arms 21 may be each actuated by lever and cam mechanism, of which a suitable example is shown in Fig. 1, comprising a lever 29 carried by the sleeve 22 and coupled by rod 30 to a lever 31 fulcrumed on a shaft 32 and carrying a roller 33 acted on by a cam 34 on a transverse shaft 35 carried in brackets 35ª and shown in Fig. 3 as driven by gearing 36, 37, from a main driving shaft 38 carrying fast and loose pulleys 39—39ª.

The roller 33 is held in engagement with the cam 34 by means of a spring 33ª suitably housed in a telescopic casing 33ᵇ, 33ᶜ, the sleeve 33ᶜ being connected to a link 33ᵈ rigidly attached to the lever 31.

Figures 6, 7, 8:
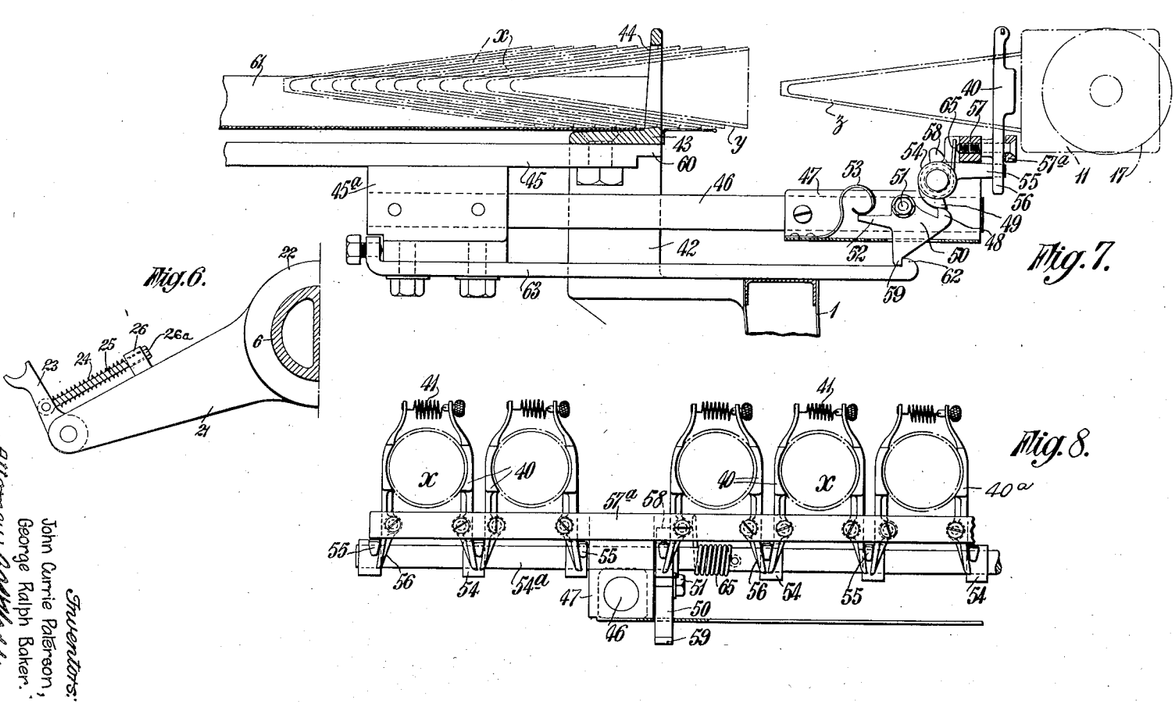
Fig. 6 is a detail view of a driving and transferring device for the mould shells.
Fig. 7 is a detail side elevation with parts in section of means for removing the finished cones from the cores.
Fig. 8 is a partial detail end elevation of part of the means shown in Fig. 7

The cone extracting means before referred to are shown more particularly in Figs. 7 and 8 and comprise a series of reciprocating gripping devices having pivoted jaws 40 under pressure of light springs 41 and which surround or embrace the cones and then move away from the cores to pass the cones through apertures which will free them from roughnesses around their open edges. The engaging faces of the jaws 40 have rubber sleeves 40ª for the better gripping of the cones.

In said last mentioned figures there is shown one of two arms 42 carrying an angular member 43 provided with apertures 44 for receiving the wafer cones $x$. Carried between the member 43 and the frame are two bars or plates 45, one at each side, provided with brackets 45ª to each of which is attached a guide rod or rail 46 supporting trip mechanism controlling the extractors 40. The said trip mechanism comprises a shoe or sleeve 47 loosely mounted upon the rod 46 and two locking noses or projections 48, 49, the former on the trip 50 pivoted at 51 on the shoe and having an extension 52 acted on by a light spring 53. The nose 49 is carried by a sleeve 54 (of which there is one for each cone in a row and one extra) fast on a shaft 54ª, integral with an arm 55 which extends between tails 56 of adjacent pairs of jaws 40 which latter are pivotally mounted on a transverse bar 57. It should be mentioned that at the extreme ends of the row the arms 55 engage only one jaw tail. Two of the sleeves 54 have also integral therewith a further nose 58 to co-operate with abutments 60 mentioned later and the trip 50 has a second nose 59. The shoes 47 are adapted to be reciprocated on the guide rods 46 by cam mechanism hereinafter described in such a manner that on their rearward movement viz, to the left in Fig. 7 the two noses 58 engage the fixed abutments 60, one of which only is shown on the bar 45, which causes the sleeves 54 to be rotated clockwise and their noses 49 to engage the noses 48 on the trips. At the same time the arms 55 are rocked and each cams two adjacent jaw tails 56 apart thus separating the jaws 40 to release the cones at the position $y$ Fig. 7. The cones are nested and pushed through the apertures 44 to remove roughness by following cones as they are delivered and then finally received in curved troughs or guides 61 ready for removal.

As the shoe 47 again moves forward, the nose 59 engages a projection 62 on a stationary bar 63 secured to a bracket 45ª on the machine frame and continued forward movement of the shoe causes the trip 50 to be rocked clockwise, thus releasing the co-operating noses 48 and 49 and permitting the sleeves 54 to return to normal position under action of a spring 65 coiled about the shaft 54ª so that the jaws are allowed, under action of their springs 41, to embrace other cones which have in the meantime been delivered at position $z$ (Fig. 7).

Mechanism suitable for effecting the movements described may be as shown in Figs. 1, 2 and 3 and comprises a central cam 66 upon the aforesaid transverse shaft 35, this cam acting on a roller 67 or other antifriction device carried by a double lever 68 fulcrumed on shaft 32 and pivoted at its upper end to a double link 69 connected to the extractor shoes 47. The lever 68 is held in engagement with the cam by means of a helical spring 70 connected at one end to the machine frame and at the other end to a cord or chain 71 passing about a pulley 72 and attached to the lever.

After the cones have been removed from the mould members 3 at the delivery position 9, as previously described, the mould members continue to move to the commencement of the course to complete a new row of moulds, and during this part of the transferring movement beyond the racks 20 the contour of the cam path is such that the cores have room to assume a vertical position by gravity as shown in Fig. 1 ready for reinsertion into the completed shells as previously explained for a further batch of cones to be baked.

Figure 4:
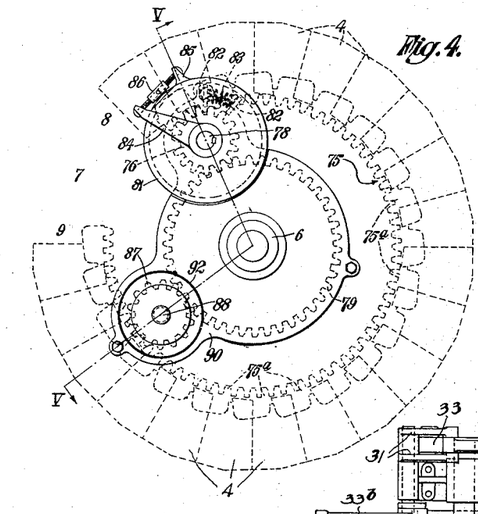
Fig. 4 is a detail side elevation showing mechanism for holding the mould halves together.
Figure 5:
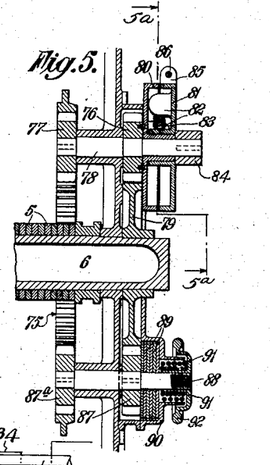
Fig. 5 is a section on the line V—V of Fig. 4.

It is necessary to secure and press the two shells or members 3 of the mould forcibly together during the entire baking operation, and for this purpose there has been devised a novel form of mechanism, illustrated in detail in Figs. 4 and 5 of the drawings and which comprises in the first place an internal toothed or crown wheel 75 built up of toothed sections 75$^a$ carried by each of the shell blocks 4. Two pinions 76 and 77, one loose and one fast, are carried by a shaft 78 mounted in the frame of the apparatus and are adapted to engage respectively a spur-wheel 79 loose on the central shaft 6, and the internally toothed crown 75. The shaft 78 is located adjacent the commencement of the rotary course of the moulds. Rigidly secured to the loose pinion is an inner circular flanged disc 80 on the hub of which is loosely carried a second outer similar disc 81, and spaced lugs 82 extending inwardly from said discs are connected by a compression spring 83. Rigidly mounted on the outer end of the shaft 78 is an upwardly extending arm 84 connected to a lug 85 on the outer disc by means of an adjustable turnbuckle link 86 or equivalent. With the parts so disposed, on clockwise rotation of the shaft 78 by means of the crown 75 and the fast pinion 77, the compression spring 83 tends to force the inner disc 80 and associated pinion 76 still further in a clockwise direction. Movement is thus transmitted through the loose pinion 76 and the gear wheel 79 to a further pinion 87 fast on a shaft 88 located near the termination of the mould course. This shaft also carries a similar pinion 87$^a$ fast thereto which meshes with the rack 75. It will thus be seen that as the moulds rotate, the blocks 4 carrying the shell members 3, will, between the positions of the shafts 78 and 88, be subjected to a spring pressure tending to hold them in close contact because the body of mould members, moving clockwise, turns gear wheel 87$^a$ clockwise (Fig. 4); gear wheel 87 also turns clockwise and, through gear 79, turns gear 76 clockwise. This gear 76, through spring 83, acts with spring pressure to tend to turn gear wheel 77 clockwise faster than the movement of the mould bodies allows. Thus at all times the pressure of the spring 83 acts to keep the mould members in close contact with one another in their course from the point of engagement of the gear 77 to that of engagement of the gear 87$^a$. The degree of spring pressure can be regulated by adjustment of the link 86.

It will be understood that as there are always more moulds to the right of a vertical line through the axis of the mould path (as seen in Fig. 1) than there are on the left of this line, the body of moulds will tend to move forward under the influence of gravity.

The movement of the moulds and cores in their rotary path may be braked to prevent over-running by means of friction discs 89 adapted to bear on a face of the pinion 87. Said discs are shown as housed in a casing 90 and are under the action of springs 91 the pressure of which can be adjusted by means of a screw cap 92 on the end of shaft 88 so that an adjustable braking effect can be obtained.

Figure 9:
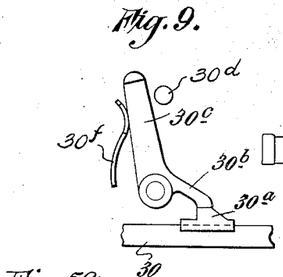
Fig. 9 is a detail view of a device for arresting the moulds at correct position.

There is also provided a safety device for arresting the movement of the moulds and cores at the correct position for discharge of the cores, such a device is shown in Figs. 1 and 9.

A detent 30$^c$ is pivoted to the machine frame and in its normal position engages a stud 30$^d$ on the foremost of the mould members. To release this mould member so that it is free to be lifted as before described the following mechanism is employed.

Rigidly mounted on each of the connecting links 30 previously referred to is a pawl or abutment 30$^a$ adapted to engage one arm 30$^b$ of a bell crank fulcrumed on the frame, the other arm of said bell crank constituting the aforesaid detent 30$^c$. The said bell crank is under the action of a spring, 30$^f$ tending to rock it clockwise so that upon movement of link 30 to the left in Fig. 1, that is, when the row of moulds and cones is being brought to the delivery position, the pawl is disengaged from the bell crank, the latter being then rocked clockwise under the action of its spring whereby the detent 30$^c$ is moved into the path of a pin 30$^d$ (Fig. 1) carried by the lug 15$^a$ of the mould frame 4, thus arresting the moulds in proper position. Upon return movement of the link 30, that is to say when the trip feed mechanism 21, 23 is returning to engage another row of moulds, the pawl 30$^a$ again engages the bell crank and rocks the detent 30$^c$ out of the path of the pin 30$^d$.

It is also necessary to secure the cores 10 within the moulds 3 during the baking operation and as suitable means for this purpose there is provided for each row of cores a number of locking devices, say two for each row, each of these devices comprising a bolt 93 rigidly mounted in the core frame 11 (see Fig. 2) and extending into a socket or aperture 94 in the mould block 4, the aperture being shaped to hold the bolt in unlocked position. The bolt has a T head 95 which when turned, will lock in the aperture 94 and secure the frame 11 and the bolt 4 securely together. To effect this turning movement each bolt is provided at its outer end with two extending fingers 96, 97 placed at 90 degrees to each other. After the filling position is passed and before the final pressing-in action of the plate 73 on the core as above explained has been completed, one of said fingers is engaged by a projection 98 (Fig. 1) on the casing lying in its path which causes it to be rotated for 90 degrees and turns the bolt to lock it against extraction from the mould block by means of its T head 95. Just previously to reaching the delivery position the second finger is engaged by another projection 99 (Fig. 1) and the bolt is rotated back to its original position, thus releasing the cores.

To now refer to means for heating the casing 1 there may be provided at the base of the machine a series of burner tubes 100 branched off from the pipes 101 to different extents to bring the burners close to the outside of the moulds but out of the path of any moving parts. The pipes 101 are shown as supplied with gas from a main 102 through valved or controlled pipe connections 103. For heating the space interiorly of the moulds the main shaft 6 is hollow and is supplied with gas from a connection 104. This shaft is shown with a central rib 105 and the channel 105$^a$ at one side conducts the gas to a series of spaced burner elements 106 arranged on an arc of a circle as close as possible to the inner faces of the moulds and inclined in the lateral direction of the casing in order that the entire surface of the moulds shall be evenly heated during their rotation. The gas passes from the shaft into said burner elements by means of ports 107 of which there may be one at each side of the vertical axis of the apparatus (see more particularly Fig. 2).

Any other desired means for heating the baking chamber may be used and where the shell castings or blocks themselves are interiorly heated this would be preferably accomplished by electric heating elements 108 contained therein receiving current from contacts or brushes 109 on the central shaft 6 as the moulds rotate. Other electric heating elements 110 may also be disposed in the cores 10 and suitably connected for energization.

Figure 5A:
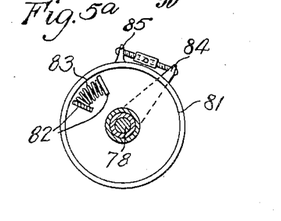
Fig. 5A is a cross-section on line 5A—5A of Fig. 5.

The operation of the machine is as follows:—The parts being in the position shown in Fig. 1, charges of batter are squirted by the pump (not shown) through the openings 1$^b$ in the casing and fall into the set of open moulds shown at 9$^a$. This will occur while the cam 34 is operating through lever 31, rod 30 and lever 29 to lift up the mould body from the position 9 to position 8, the final portion of this movement causing the mould body thus lifted to push against the last mould body shown at position 8 and so rotate the whole set of mould bodies through a distance equal to the thickness of one mould body. During this latter movement the cores 10 of the mould which has received the charge will descend along track 18$^a$ and enter the mould. During the commencement of the lifting movement of the mould body from position 9 to position 8, the cores 10 shown at position 9 will be gradually drawn away from the mould body owing to the shape of path or track 18 and will also be rotated on their own axes by engagement of their pinion 17 (Fig. 2) with the fixed rack 20 (Fig. 1). This will reverse them over the bar 46, whereupon the finished wafer cones are drawn off them by the mechanism shown in Figs. 7 and 8. The withdrawn set of cores passing free of the end of the rack 20 can then fall into vertical position and are carried up with the rising mould to the position 8. While the mould is being raised from 9 to 8 the rest of the moulds are being held in firm contact with one another by the gearing shown in Figs. 4, 5 and 5A and particularly by the spring 83 therein as previously explained. In the intermittent movement of the moulds around the circle the batter is baked, as for example by the heat from the burners 100, so that as each mould reaches the position 9 the batter is baked as a wafer and is ready for withdrawal. The withdrawn and detached wafer cones nest into one another and the stack is gradually pushed outwardly by the accretion of cones, through the eyes 44 into the chute 61 and thence to a receiving table or the like (not shown).

The channel 105$^b$ of main shaft 6 at the other side of rib 105 may be used as a reservoir for graphite or other suitable lubricant to lubricate the arms or spokes 5 carrying the mould blocks, a channel or apertures 105$^c$ (Fig. 1) being shown for this purpose.

The invention is not limited to the particular details of construction arrangement or combination of parts hereinbefore described and illustrated in the accompanying drawings since the same may be varied within limits prescribed by the following claims without departing from the spirit of the invention.

What we claim as our invention and desire to secure by Letters Patent of the United States is:—

1. In apparatus for making receptacles of baked wafer material, a series of moulds arranged in an arc of a circle in an endless path and each comprising a part element formed by a semi-conical recess in a face of one member and a complementary semi-conical recess formed in the adjacent face of another member, means for moving said moulds through said path, means for separating one member from its adjacent member at the termination of the path and transferring it to another member at the commencement of the path, a conical core for each mould insertable into and removable therefrom, means for first slightly withdrawing the cores from the moulds in a radial direction, means for separating the part elements of the moulds at the termination of the path, and means for completely removing the cores by a rotary movement thereof from the moulds after separation of its elements.

2. In apparatus for making receptacles of baked wafer material, a series of moulds arranged in an arc of a circle in an endless path and each comprising a part element formed by a semi-conical recess in a face of one member and a complementary semi-conical recess formed in the adjacent face of another member, the axes of said conical recesses being radial to the axis of the path, means for moving said moulds through said path, means for separating one member from its adjacent member at the termination of the path and transferring it to another member at the commencement of the path, a conical core for each mould insertable into and removable therefrom, means permitting supply of wafer material to the moulds at the commencement of the course while the axes of the moulds are substantially vertical, and means for completely removing the cores from the moulds after transfer of the mould member at the termination of the path while the axes of the moulds are substantially horizontal.

3. In apparatus for making receptacles of baked wafer material, the combination of a series of two-part conical moulds arranged in an arc of a circle in an endless path with their larger diameters directed towards the outer periphery of the circle, means permitting supply of wafer material to the moulds at the commencement of the path, a conical core for each mould and insertable thereinto after supply of the wafer material, means for moving the moulds and inserted cores through said path, heating means adjacent the course of the moulds by which the wafer material is baked, and means adjacent the termination of the course for removing the cores with the baked receptacles thereon to a position exterior of the periphery of said circle.

4. In apparatus for making receptacles of baked wafer material, the combination of a series of two part conical moulds arranged in an arc of a circle in an endless path with their larger diameters directed towards the outer periphery of the circle, means permitting supply of wafer material to the moulds at the commencement of the path while the axes of the moulds are substantially vertical, a conical core for each mould and insertable thereinto after supply of the wafer material, means for moving the moulds and inserted cores through said path, heating means adjacent the course of the moulds by which the wafer material is baked, and means adjacent the termination of the course for removing the cores with the baked receptacle thereon to a position exterior of the periphery of said circle while the axes of the moulds are substantially horizontal.

5. In apparatus for making receptacles of baked wafer material, the combination of a heated baking chamber, a series of moulds each comprising a semi-conical part formed by a recess in one member and another semi-conical part formed by a complementary recess in a second member, said members having such recesses on opposite sides and being juxtaposed to produce complete moulds, and said moulds being arranged in an endless path, means permitting supply of wafer material to the moulds adjacent the commencement of the path, a conical core for each mould movable in the plane of said endless path after supply of the wafer material, means for moving the charged moulds and inserted cores through said baking chamber in the path aforesaid, means for separating one part mould member from its companion member adjacent the end of the path to permit removal of the core with the finished receptacle thereon, means for swinging the cores in the plane of the said endless path free of the mould, means for restricting the movement of the contacting moulds along the said path, and means for transferring said removed mould member to another complementary member at the commencement of the path to constitute a new mould.

6. In apparatus for making receptacles of baked wafer material, the combination of a mould comprising separable members and adapted to move in an endless path, a core adapted to fit said mould with slight clearance, means for permitting supply of wafer material to the mould, means for inserting the core in the mould at one part of the path after charging of the mould with wafer material, means for rotating the core in the plane of the endless path so as to withdraw the core from said path, and means for removing the receptacle from the core.

7. In apparatus for making receptacles of baked wafer material, the combination of a mould comprising separable members and adapted to move it in an endless path, a core adapted to fit said mould with slight clearance, means for permitting supply of wafer material to the mould, means for inserting the core in the mould at one part of the path after charging of the mould with wafer material, means for rotating the core through an arc of a circle in the plane of the endless path so as to remove the core from said path, and means for removing the receptacle from the core, said latter means comprising reciprocating jaws adapted to embrace the receptacle and trip mechanism adapted to control the opening and closing of said jaws.

8. In apparatus for making receptacles of baked wafer material, the combination of a plurality of bipartite moulds arranged in an arc of a circle and adapted to move intermittently through a heated baking chamber in an endless path having a gap between the commencement and termination thereof, means for permitting supply of wafer material to the moulds while they are stationary, a core for each mould insertable into and removable therefrom, cam means for guiding the cores into the moulds adjacent the commencement of the path, means adjacent the termination of the path for transferring one part of each mould through the gap aforesaid to the commencement of the path to provide other complete moulds, means for removing the cores from the moulds with the finished receptacles thereon to a position outside the path, means for withdrawing the receptacles from the cores, and means for transferring the latter through the gap to the commencement of the path for reinsertion into said other completed moulds.

9. In apparatus for making receptacles of baked wafer material, the combination of a series of moulds each comprising two separate conical members and movable through a rotary path with their larger diameters disposed at the exterior of said path, a conical core for each mould insertable into and removable therefrom, means for separating the members of the mould at a point in said path, rack and pinion mechanism adjacent said point for rotating said cores to a position exterior to the path to permit removal of the finished articles on said cores, means for moving the separated mould member from its fellows and rolling the pinion on the rack during such movement, said rack and pinion mechanism also acting to further rotate said cores after removal of the articles, and cam means for guiding the cores to another point in the path for reinsertion into the moulds.

10. In apparatus for making receptacles of baked wafer material, the combination of a plurality of bipartite moulds adapted to receive wafer material and mounted for movement in an endless circular path about a horizontal axis, studs associated with each mould, an oscillating driving member having a trip device adapted to engage said studs to transfer one mould member through a gap in the path to the commencement of the latter into contact with another mould member and means for moving said driving member through a course sufficient to ensure the completion of movement of all the moulds through one mould width.

11. In apparatus for making receptacles of baked wafer materials, the combination of a plurality of moulds each comprising two separable half members, cores insertable into and removable from said moulds, studs associated with the moulds, and means for intermittently rotating one of said moulds and cores through an endless circular path about a horizontal axis; said means comprising an oscillating driving member and a spring trip device carried thereby which for forward drive of the moulds and cores, engages said studs, whereby the half mould members are transferred from the end to the commencement of said path and the complete moulds with the cores therein are rotated together through a distance corresponding to that between the axes of two adjacent moulds.

12. In apparatus for making receptacles of baked wafer material, the combination of a series of moulds each comprising two separable members adapted to receive wafer material, a core for each mould insertable into and removable therefrom, means for moving said moulds and cores through an endless circular path, and means for pressing together the separable members of the whole series during their passage through said path; said latter means comprising rack and pinion mechanism and spring controlled devices associated therewith adjacent the commencement of the path and tending to force the mould members in the direction of rotary travel of the series, against other rack and pinion mechanism located adjacent the termination of the path.

13. In apparatus for making receptacles of baked wafer material, the combination of a series of moulds each comprising two separable members, adapted to receive wafer material, a core for each mould insertable into and removable therefrom, means for moving said moulds and cores through an endless circular path, means for pressing together the separable members of the whole series during their passage through said path; said latter means comprising rack and pinion mechanism and spring controlled devices associated therewith adjacent the commencement of the path and tending to force the mould members in the direction of rotary travel of the series, against other rack and pinion mechanism located adjacent the termination of the path; and friction braking means for preventing over-running of the moulds during their movement through the rotary path.

14. In apparatus for making receptacles of wafer material, the combination of a plurality of mould bodies each comprising a portion of two adjacent sets of moulds and adapted when placed together to constitute an arcuate series of sets of moulds less by one than the number of said bodies, means for severally supporting said bodies upon a common axis, the bodies being severally rotatable in a cylindrical path about said axis and their collective thickness being less than the circumferential length of their path, means for carrying each mould body successively across the gap in the path, and means operating through spring pressure for retaining the remainder of said bodies in contact with one another during the movement of said remainder as well as during the state of rest thereof.

15. In apparatus for making receptacles of wafer material, the combination of a plurality of mould bodies each comprising a portion of two adjacent sets of moulds and adapted when placed together to constitute an arcuate series of sets of moulds less by one than the number of said bodies, means for severally supporting said bodies upon a common axis, the bodies being severally rotatable in a cylindrical path about said axis and their collective thickness being less than the circumferential length of their path so that a gap is left in said path, means for freeing each mould body successively as it approaches such gap, means for retaining the remainder of said bodies in contact with one another, means for carrying the free body across the gap, and cores carried by said bodies respectively and movable in a direction to and from the common axis.

16. In apparatus for making receptacles of wafer material, the combination of a plurality of mould bodies, means for severally supporting said bodies upon a common axis, the bodies being severally rotatable in a cylindrical path about said axis and their collective thickness being less than the circumferential length of their path so that a gap is left in said path, means for carrying each mould body successively across such gap, means for retaining the remainder of said bodies in contact with one another, cores carried by said bodies respectively and movable in a direction to and from the common axis, means for extracting said cores successively, and means for reversing the extracted core outwardly from the common axis, said extracting and reversing means being located in proximity to the gap.

17. In apparatus for making receptacles of wafer material, the combination of a plurality of mould bodies each comprising a portion of two adjacent mould sets and adapted when placed together to constitute an arcuate series of sets of moulds less by one than the number of said bodies, means for severally supporting said bodies upon a common axis, the bodies being severally rotatable in a cylindrical path about said axis and their collective thickness being less than the circumferential length of their path so that a gap is left in said path, means for carrying each mould body successively across such gap, means for retaining the remainder of said bodies in contact with one another, sets of cores carried by said bodies respectively and movable in a direction to and from the common axis, means for extracting said core sets successively, and means for reversing the extracted core set outwardly from the common axis, said extracting and reversing means being operable upon the core set at the gap.

18. In apparatus for making receptacles of wafer material, the combination of a plurality of mould bodies each comprising a portion of two adjacent sets of moulds and adapted when placed together to constitute an arcuate series of sets of moulds less by one than the number of said bodies, means for severally supporting said bodies upon a common axis, the bodies being severally rotatable in a cylindrical path about said axis and their collective thickness being less than the circumferential length of their path so that a gap is left in said path, means for carrying each mould body successively across such gap, means for retaining the remainder of said bodies in contact with one another, sets of cores mounted on said bodies respectively and movable in a direction radial to the common axis, means for radially moving said core sets successively, and means for reversing the extracted core set, said radially-moving and reversing means being operable upon the core set at the gap.

19. In apparatus for making receptacles of wafer material, the combination, with a toothed crown, of a plurality of mould bodies each comprising a portion of two adjacent sets of moulds and a portion of said crown, the bodies being severally rotatable in a circular path about an axis and their collective thickness being less than the circumferential length of their path so that a gap is left in said path, means for engaging each mould body successively and carrying it across such gap, and gearing for connecting certain of the toothed crown portions near opposite ends of the gap, said gearing comprising a spring-controlled wheel acting to retain the remainder of said mould bodies in contact with one another.

20. In apparatus for making receptacles of wafer material, the combination, with a toothed crown, of a plurality of mould bodies each comprising a portion of two adjacent sets of moulds and a portion of said crown, the bodies being severally rotatable in a circular path about an axis and their collective thickness being less than the circumferential length of their path so that a gap is left in said path, means for carrying each mould body successively across such gap, and means for retaining the remainder of said bodies in contact with one another; said retaining means comprising a toothed wheel centered on said axis, two planet wheels engaging therewith, a toothed wheel rigidly connected to one planet wheel and engaging the toothed crown portion near one end of the gap, a spring drive, and a toothed wheel connected through said spring drive with the other planet wheel and engaging the toothed crown portion near the other end of the gap.

21. In apparatus for making receptacles of wafer material, the combination of a plurality of mould bodies, means for severally supporting said bodies so that they may move independently in an endless path, their collective thickness being less than the circumferential length of their path so that a gap is left in said path, means for carrying each mould body successively across such gap, sets of cores rotatable about axes carried by said bodies respectively, a stationary rack located in proximity to said gap, and a pinion carried by each core set adapted to mesh with said rack, whereby the core sets are successively reversed outwardly from the path of the mould bodies.

22. In apparatus for making receptacles of wafer material, the combination of a plurality of mould bodies each comprising a portion of two adjacent moulds and adapted when placed together to constitute a plurality of sets of moulds less by one than the number of said bodies, means for severally supporting said bodies in an endless path, their collective thickness being less than the circumferential length of their path so that a gap is left in said path, means for carrying each mould body successively across such gap, cores carried by and slidingly movable on said bodies respectively, a guide track for said cores shaped to withdraw said cores successively, means for rotating the withdrawn core outwardly from the path of the mould bodies, said withdrawing and rotating means being operable upon the core at the gap, and means for engaging the finished wafer receptacle and drawing it off the rotated core.

23. In apparatus for making receptacles of wafer material, the combination of a plurality of mould bodies each comprising a portion of two adjacent sets of moulds and adapted when placed together to constitute an arcuate series of sets of moulds less by one than the number of said bodies, means for severally supporting said bodies upon a common axis, the axes of the several moulds lying radially to said axis and the major diameter of each mould being at the outer side thereof, the bodies being severally rotatable in a cylindrical path about said axis and their collective thickness being less than the circumferential length of their path so that a gap is left in said path, sets of cores slidably mounted on said mould bodies respectively in a direction radial to the aforesaid common axis, means for partially withdrawing said core sets successively, and means for rotating the partially withdrawn core set outwardly in a plane perpendicular to the common axis, said withdrawing and reversing means being automatically operable upon the core set at said gap.

24. In apparatus for making receptacles of wafer material, the combination of a plurality of mould bodies each comprising a portion of two adjacent sets of moulds and adapted when placed together to constitute an arcuate series of sets of moulds less by one than the number of said bodies, means for severally supporting said bodies upon a common axis, the bodies being severally rotatable in a cylindrical path about said axis and their collective thickness being less than the circumferential length of their path so that a gap is left in said path, means for carrying each mould body successively across such gap, means for retaining the remainder of said bodies in contact with one another, sets of cores, carriers for said cores mounted on said bodies respectively and movable in a direction radial to the common axis, the cores being rotatably mounted on said carriers, means for radially moving said carriers successively to extract the core sets, and means for rotating the extracted core sets on their carriers, said radially-moving and reversing means being operable upon the core set at the gap.

25. In apparatus for making receptacles of wafer material, the combination of a plurality of mould bodies, means for severally supporting said bodies upon a common axis, the bodies being severally rotatable in a cylindrical path about said axis and their collective thickness being less than the circumferential length of their path so that a gap is left in said path, means for carrying each mould body successively across such gap, means for retaining the remainder of said bodies in contact with one another, sets of cores, carriers for said core sets mounted on said bodies respectively and movable in a direction to and from the common axis, the core sets being rotatable on said carriers, a cam track to guide said carriers, the cam track being shaped to partially extract said core sets successively at the commencement of the gap, and means for reversing the extracted core set outwardly from the common axis said reversing means being operable during part of the passage of the core set across the gap, and both said extracting and said reversing means being located in proximity to the gap, the core set being free from the reversing means during subsequent movement across the gap and falling to vertical by gravity, and the cam track acting to hold the core sets free from the mould bodies and to return them into the moulds at the termination of the gap.

26. In apparatus for making receptacles of wafer material, the combination of a plurality of mould bodies, means for severally supporting said bodies upon a common axis, the bodies being severally rotatable in a cylindrical path about said axis and their collective thickness being less than the circumferential length of their path so that a gap is left in said path, means for carrying each mould body successively across such gap, means for retaining the remainder of said bodies in contact with one another, sets of cores, carriers for said core sets mounted on said bodies respectively and movable in a direction to and from the common axis, the core sets being rotatable on said carriers, a cam track to guide said carriers, the cam track being shaped to partially extract said core sets successively at the commencement of the gap, means for reversing the partially-extracted core set outwardly from the common axis; said reversing means being operable during part of the passage of the core set across the gap, and both said extracting and said reversing means being located in proximity to the gap, the core set being free from the reversing means during subsequent movement across the gap and falling to vertical by gravity, and the cam track acting to hold the core sets free from the mould bodies and to return them into the moulds at the termination of the gap; and wafer extracting means adapted to advance to the cores in their reversed position and engage the wafers thereon and to recede from the cores prior to the freeing of the cores from their reversing means.

27. In apparatus for making receptacles of baked wafer material, the combination of a mould comprising separable members and adapted to move in an endless path, a core insertable into and removable from said mould, means for separating the mould members successively from their fellows, and means for removing the core from the mould after separation of its members; said core-removing means comprising a stationary rack, and a pinion carried by the core members and adapted to engage said rack in order to rotate the core to a position free of the path of the mould members.

28. In apparatus for making receptacles of wafer material, the combination of a plurality of mould bodies constituting an arcuate series of sets of moulds, means for severally supporting said bodies upon a common axis, the bodies being rotatable in a cylindrical path about said axis and severally movable across a gap in said path, means for moving the mould bodies across said gap, cores carried by said bodies respectively and movable in a direction to and from the common axis, co-operative locking means on said core bodies and mould bodies respectively, and means for operating said locking means at one point in the path and for unlocking the same at another point.

29. In apparatus for making receptacles of wafer material, the combination of a plurality of mould bodies constituting an arcuate series of sets of moulds, means for severally supporting said bodies upon a common axis, the bodies being rotatable in a cylindrical path about said axis and severally movable across a gap in said path, means for moving the mould bodies across said gap, cores carried by said bodies respectively and movable in a direction to and from the common axis, rotary locking means on said core bodies, corresponding engaging devices on said mould bodies, means for operating said locking means at one point in the path to lock, and means for unlocking the same at another point.

30. In apparatus for making receptacles of baked wafer material, the combination of a mould comprising separable members and adapted to move in an endless path, a core insertable into and removable from said mould, means for separating the mould members, pinion mechanism adapted to rotate the core to a position free of the path after separation of the mould members, and means for moving the separated mould member from its fellows and rolling the said pinion on said rack during such movement.

31. In apparatus for making receptacles of baked wafer material, the combination of a mould comprising separable members and adapted to move in an endless path, a core insertable into and removable from said mould, means for separating the mould members, rack and pinion mechanism adapted to rotate the core to a position free of the path after separation of the mould members, mechanism for removing the baked articles from the cores on reaching such position, cam mechanism for actuating the removing mechanism, and means for moving the separated mould member from its fellows and rolling the said pinion on said rack during such movement.

In witness whereof we have signed this specification.

JOHN CURRIE PATERSON.
GEORGE RALPH BAKER.